(12) United States Patent
Chen

(10) Patent No.: US 7,779,186 B2
(45) Date of Patent: Aug. 17, 2010

(54) MASTER-SLAVE CARD SYSTEM AND METHOD FOR OPERATING THE SAME

(75) Inventor: Po-Ming Chen, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 450 days.

(21) Appl. No.: 11/832,751

(22) Filed: Aug. 2, 2007

(65) Prior Publication Data
US 2009/0037552 A1    Feb. 5, 2009

(51) Int. Cl.
*G06F 13/00*    (2006.01)
(52) U.S. Cl. .................. 710/110; 710/305; 710/306; 370/316; 714/100
(58) Field of Classification Search ................ 710/110, 710/305–306; 714/100; 370/316
See application file for complete search history.

(56) References Cited

U.S. PATENT DOCUMENTS 7,518,982 B1 *  4/2009  Brown et al. ................ 370/216

* cited by examiner

*Primary Examiner*—Mark Rinehart
*Assistant Examiner*—Kim T Huynh
(74) *Attorney, Agent, or Firm*—Chun-Ming Shih; HDLS IPR Services

(57) ABSTRACT

A master-slave card system includes a master card and a plurality of slave cards connected in serial. The master card sends a command with a station-number information to the slave cards. A selected slave card designated by the station-number information sends back a response message, where the response message includes an initial packet, a plurality of data packets and a CRC check packet. The master card sends a next command to a next slave cards after the master cards identifies a correct initial packet. When the initial packet is not correct, the master card halts sending the next command until the received signal is already stopped for a predetermined silence time. The master card drops all the data packets if the CRC check packet associated with the data packet is not correct.

3 Claims, 10 Drawing Sheets

MASTER-SLAVE CARD SYSTEM AND METHOD FOR OPERATING THE SAME

BACKGROUND OF THE INVENTION

1. Field of the Invention

The present invention relates to a master-slave card system and method for operating the same, especially to a master-slave card system using polling scheme to convey command to the slave cards and method for operating the same.

2. Description of Prior Art

The conventional master-slave card system utilizes interconnected digital input and output points (DI/O) for communicating signals among master card and slave card. A related-art master-slave card system integrates all of the digital input and output points (DI/O) on a single circuit board. However, it could induce a mess if lots of digital input and output points (DI/O) are provided on the same circuit board. Moreover, the layout of the digital input and output points (DI/O) is predetermined in the beginning of manufacture of the circuit board. Therefore, the number of the digital input and output points (DI/O) may be excessive and cost is increased. Alternatively, the number of the digital input and output points (DI/O) may be insufficient and it is inconvenient for user. Another related-art master-slave card system utilizes serial communication for the I/O control of the digital input and output points (DI/O) and a half-duplex scheme is used for the communication therebetween. In the half-duplex scheme, the master card and slave card cannot send their signal to each other simultaneously. Therefore, unwanted delay occurs and the signal cannot be transmitted in real time manner.

Therefore, it is desirable to provide a more flexible connection of remote digital input and output points (DI/O) for a local master card.

SUMMARY OF THE INVENTION

It is the object of the present invention to provide a master-slave card system using polling scheme to convey command to the slave cards and method for operating the same.

Accordingly, the present invention provides a master-slave card system and method for operating the same. The master-slave card system includes a master card and a plurality of slave cards connected in serial. The master card sends a command with a station-number information to the slave cards. A selected slave card designated by the station-number information sends back a response message, where the response message includes an initial packet, a plurality of data packets and a CRC check packet. The master card sends a next command to a next slave cards after the master cards identifies a correct initial packet. When the initial packet is not correct, the master card halts sending the next command until the received signal is already stopped for a predetermined silence time. The master card drops all the data packets if the CRC check packet associated with the data packet is not correct. The master card can access optional slave cards through this operating method by polling the slave cards and designating station number. Therefore, digital input/output connections can be flexibly accessed by the master card.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
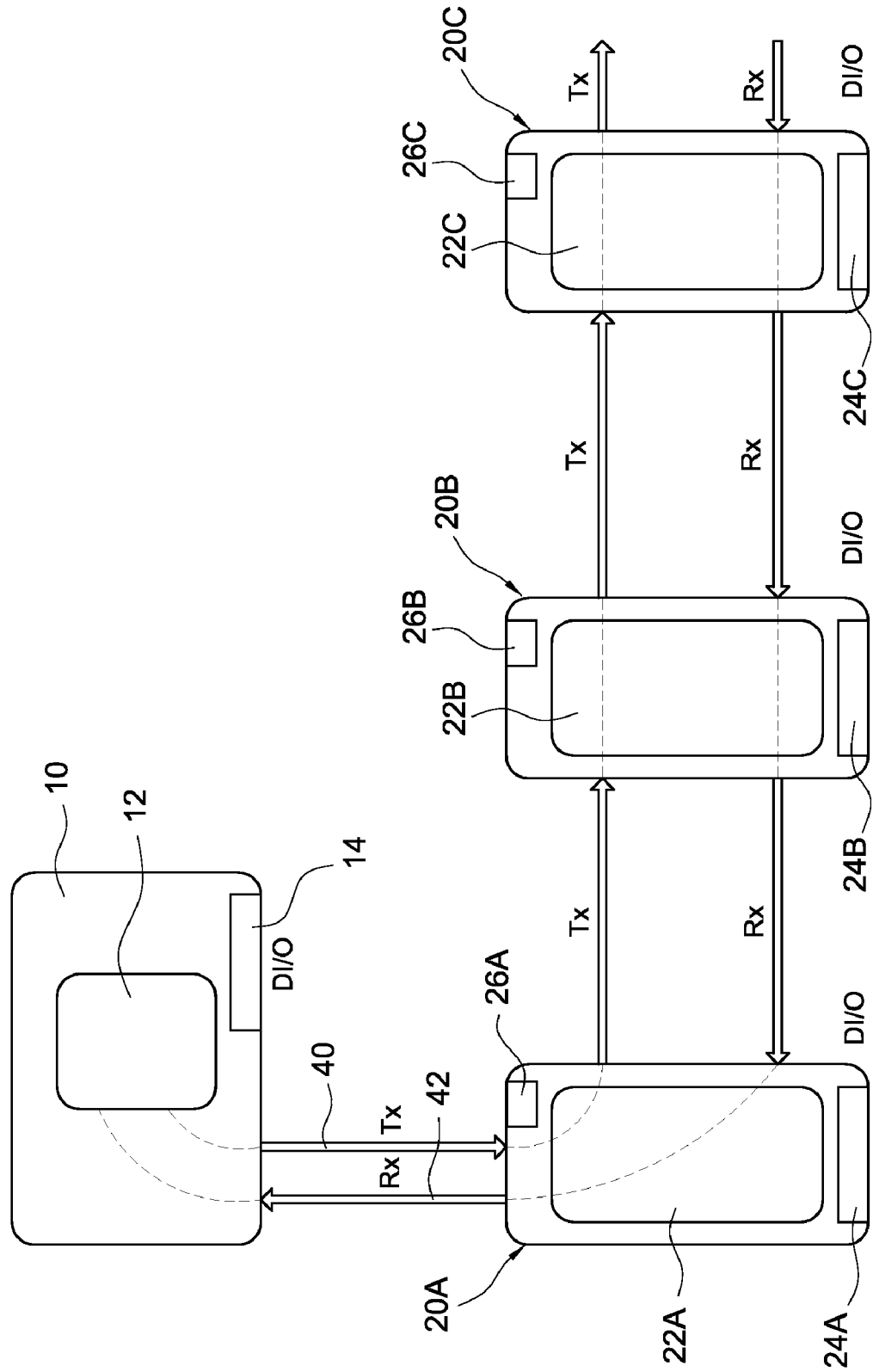
FIG. 1 shows the schematic diagram of the master-slave card system according to a preferred embodiment of the present invention.

FIG. 1 shows the schematic diagram of the master-slave card system according to a preferred embodiment of the present invention. The master-slave card system comprises a master card 10 and a plurality of slave cards 20A, 20B and 20C, wherein the master card 10 and the slave cards are connected in serial through two connection lines 40 and 42. More, particularly, in this preferred embodiment of the present invention, there are a first slave card 20A, a second slave card 20B and a third slave card 20C. It should be noted that the master-slave card system according to the present invention can be applied to slave cards with various number without departing from the scope of the present invention.

The connection lines 40 and 42 comprises a TX connection line 40 for conveying the command of the master card 10, and an RX connection line 42 for conveying the response message from the first slave card 20A, the second slave card 20B and the third slave card 20C to the master card 10. The master card 10 mainly comprises a master processor 12 and master digital input and output points (master DI/O) 14 connected to the master processor 12. The slave card, for example, the first slave card 20A comprises a first slave processor 22A, a first slave digital input and output points (first slave DI/O) 24A electrically connected to the first slave processor 22A, and a first station number switch 26A electrically connected to the first slave processor 22A. Similarly, the second slave card 20B comprises a second slave processor 22B, a second slave digital input and output points (second slave DI/O) 24B electrically connected to the second slave processor 22B, and a second station number switch 26B electrically connected to the second slave processor 22B. The third slave card 20C comprises a third slave processor 22C, a third slave digital input and output points (third slave DI/O) 24C electrically connected to the third slave processor 22C, and a third station number switch 26C electrically connected to the third slave processor 22C. In above-described master-slave card system, the station number switch 26A-26C, for example, can be dip switch to set up the station number for each slave card. The slave processor 22A-22C, for example, can be programmable logic device (PLD) to provide fast hardware process and easy software maintenance. The first slave DI/O 24A, the second slave DI/O 24B and the third slave DI/O 24C are remote DI/O for the master card 10 and can expand I/O number for the master card 10.

In above-mentioned master-slave card system, the master card 10 sends commands thereof to the first slave card 20A, the second slave card 20B and the third slave card 20C in polling manner trough the TX connection line 40. The master card 10 receives response messages from the first slave card 20A, the second slave card 20B and the third slave card 20C trough the RX connection line 42. In this way, the master card 10 can access remote DI/O. Moreover, each of the first slave card 20A, the second slave card 20B and the third slave card 20C can set up its own station number by the station number switch 26A-26C, respectively. The command sent by the master card 10 also contains information about the station number to designate one of the slave cards 20A-20C. Therefore, the slave cards 20A-20C can identify whether the command sent from the master card 10 is for themselves.

Figure 2:
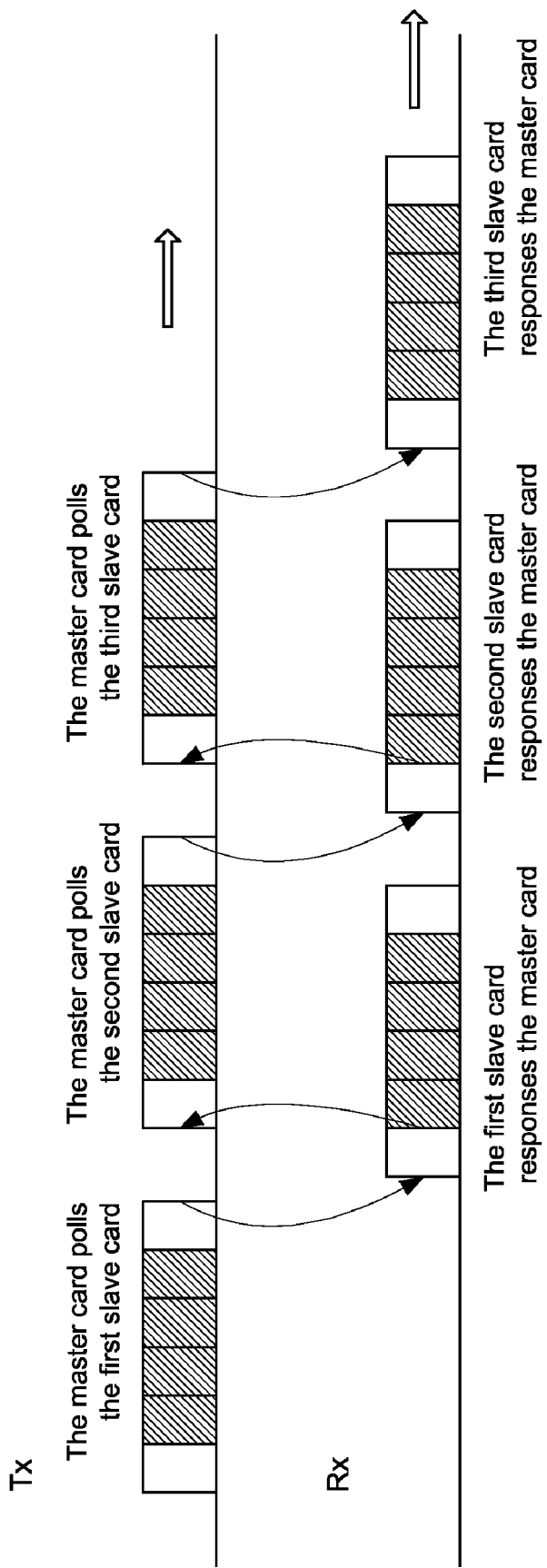
FIG. 2 is a schematic view to explain the way in which the master card polls each of the slave cards.

FIG. 2 is a schematic view to explain the way in which the master card 10 polls each of the first slave card 20A, the second slave card 20B and the third slave card 20C. The master card 10 sends command composed of multiple packets to the first slave card 20A, the second slave card 20B and the third slave card 20C, respectively, through the TX connection line 40. Each of the first slave card 20A, the second slave card 20B and the third slave card 20C decides to response the command or not to response the command according to the station number contained in the command. The master card 10 sends command to a next slave board if the master card 10 can identify station number for a currently-accessed slave board in response packets from the currently-accessed slave board. For example, the master card 10 first sends command with associated station number to the first slave card 20A (the currently-accessed slave board), and the master card 10 will not send command to the second slave card 20B (the next slave board) until the master card 10 identifies the right station number for the first slave card 20A from the response packets of the first slave card 20A. Therefore, the master card 10 sends command to the second slave card 20B while the master card 10 keeps receiving packets from the first slave card 20A. In this way, the transmission efficiency for the master-slave card system can be enhanced.

Figure 3A:
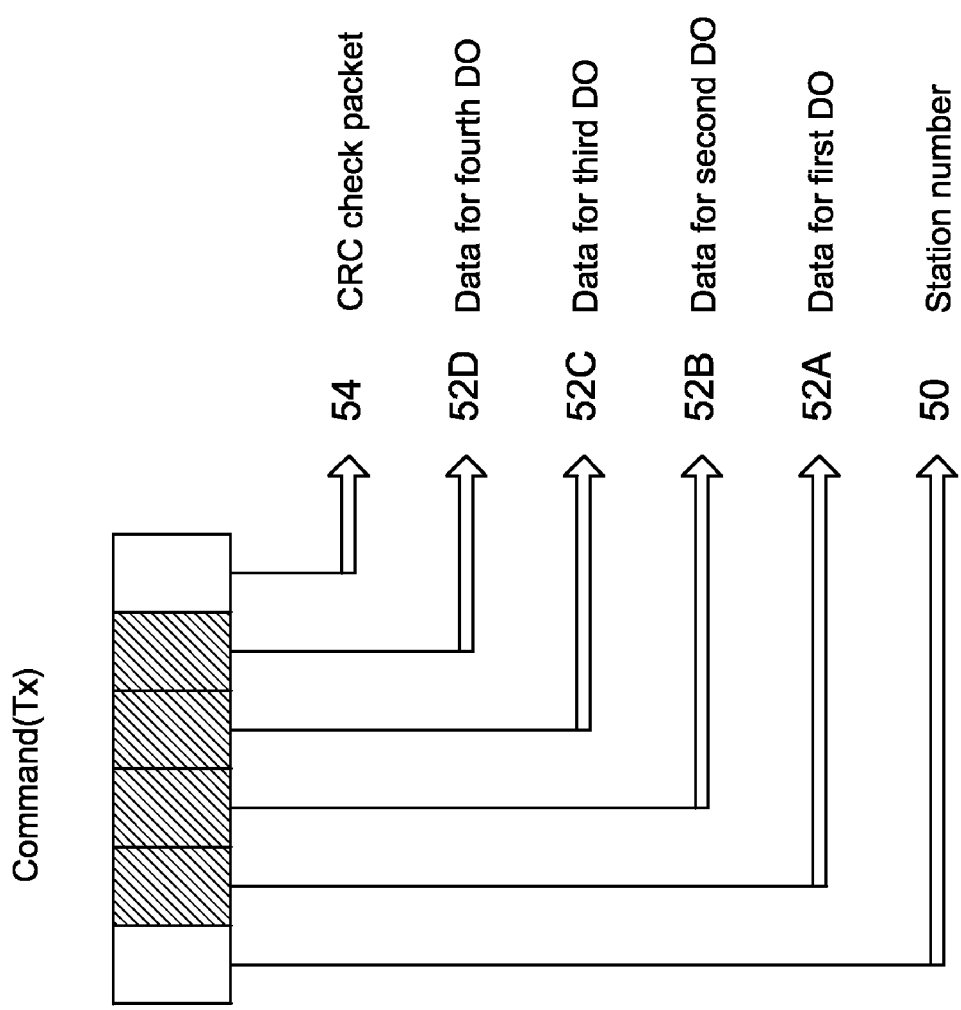
FIG. 3A shows the packet format for the command of the master card.
Figure 3B:
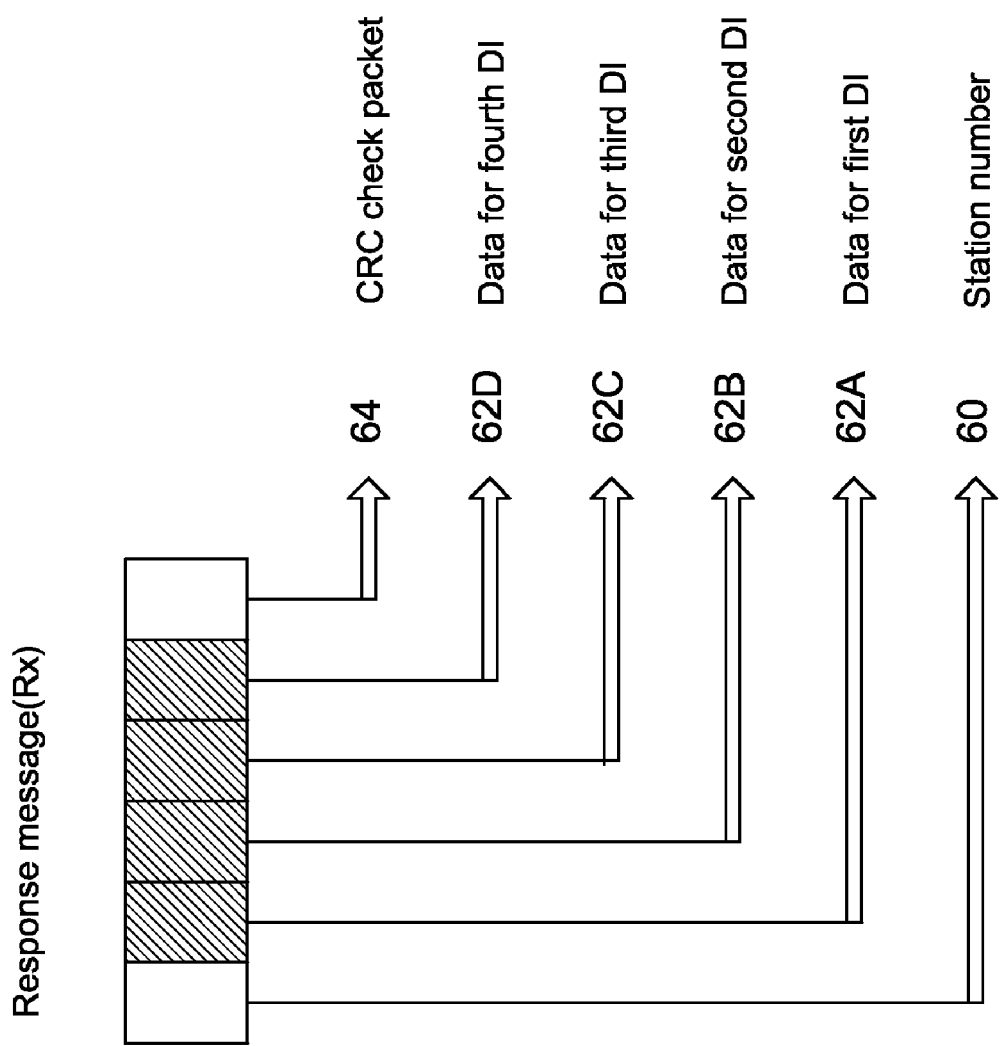
FIG. 3B shows the packet format for the response message of the slave cards

FIG. 3A shows the packet format for the command of the master card 10. FIG. 3B shows the packet format for the response message of the slave cards. With reference to FIG. 3A, the command of the master card 10 comprises an initial packet 50, four data packets 52A-52D, and a CRC check packet 54. With reference to FIG. 3B, the response message of the slave card comprises an initial packet 60, four data packets 62A-62D, and a CRC check packet 64.

Figure 4A:
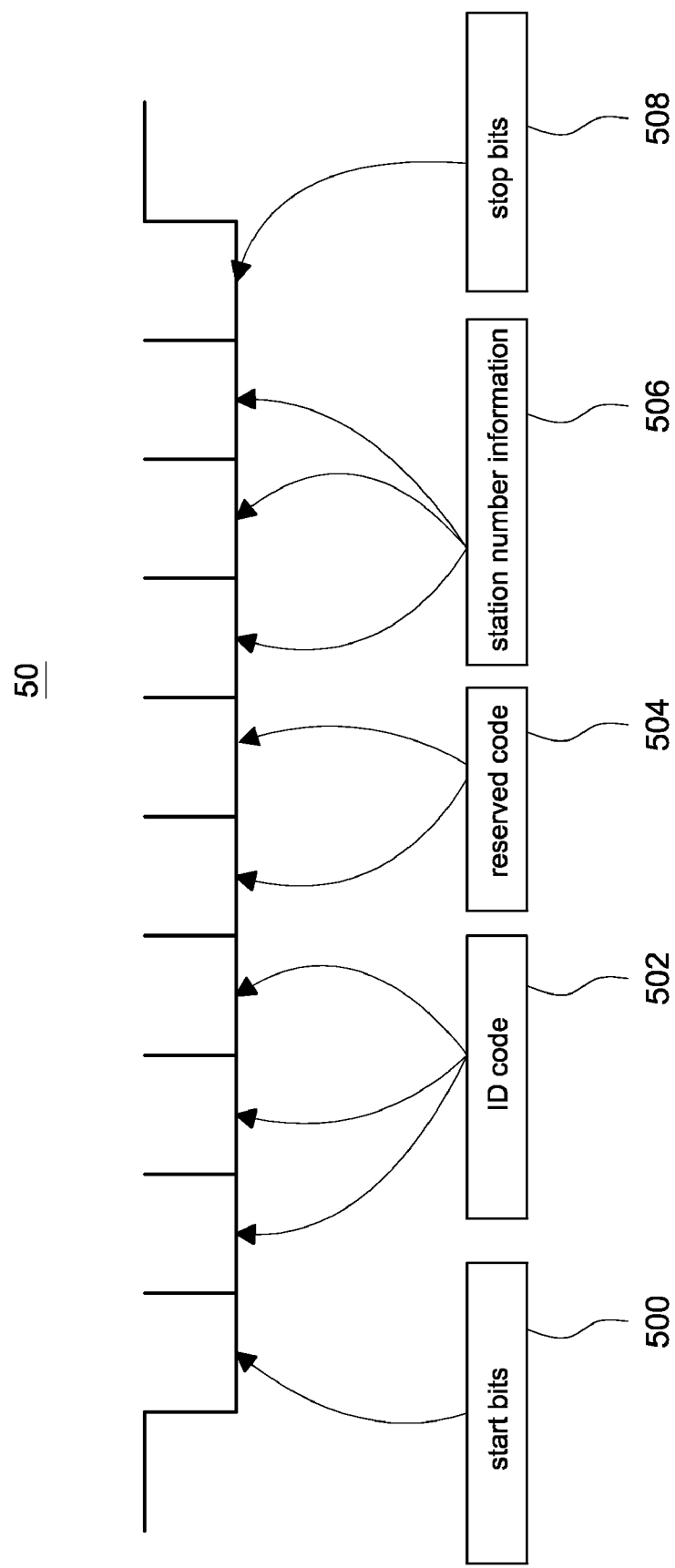
FIGS. 4A, 4B and 4C show the data structure for the initial packet, data packet, and the CRC check packet, respectively.
Figure 4B:
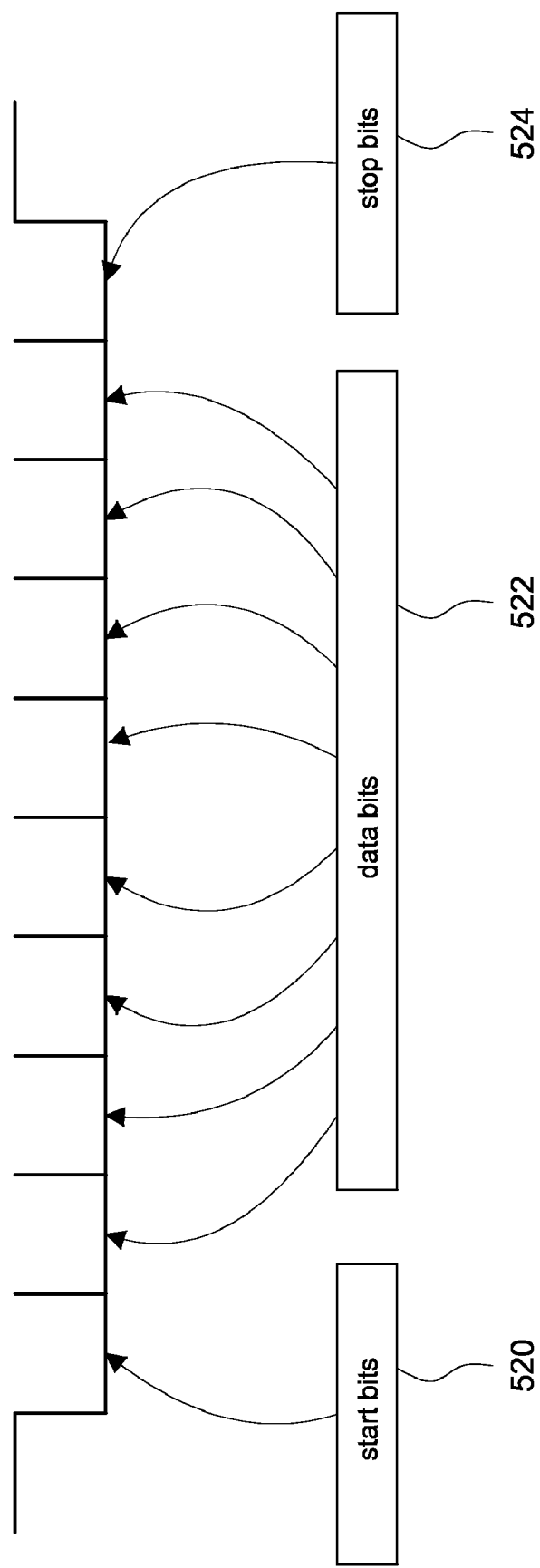
Figure 4C:
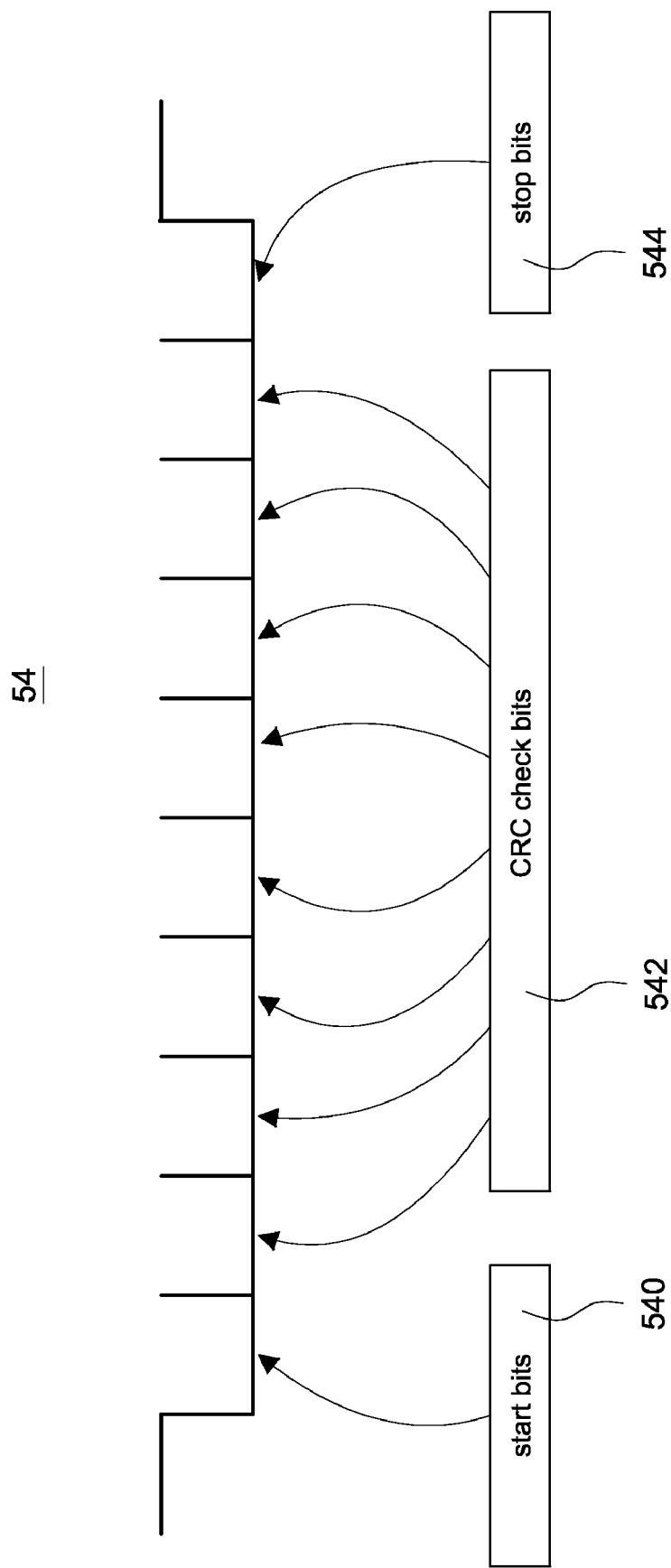

FIGS. 4A, 4B and 4C show the data structure for the initial packet 50, data packet, and the CRC check packet 54, respectively. As shown in FIG. 4A, the initial packet 50 has format compatible to UART format and comprises a start bit 500, a stop bit 508, and eight data bits which comprises ID code 502 (3 bits), reserved code 504 (2 bits) and station number information 506 (3 bits). As shown in FIG. 4B, the data packet comprises a start bit 520, a stop bit 524, and eight message data bits 522. As shown in FIG. 4C, the CRC check packet 54 comprises a start bit 540, a stop bit 544, and eight CRC check bits 542. Moreover, the response message from the slave card has the similar data structure as those shown in FIGS. 4A to 4C. Therefore, the detailed description for the data structure of the response message from the slave card is omitted here for clarity. Moreover, the packets in the command and the response message have the same length (bit number) to reduce processing complexity and enhance processing efficiency.

Figure 5:
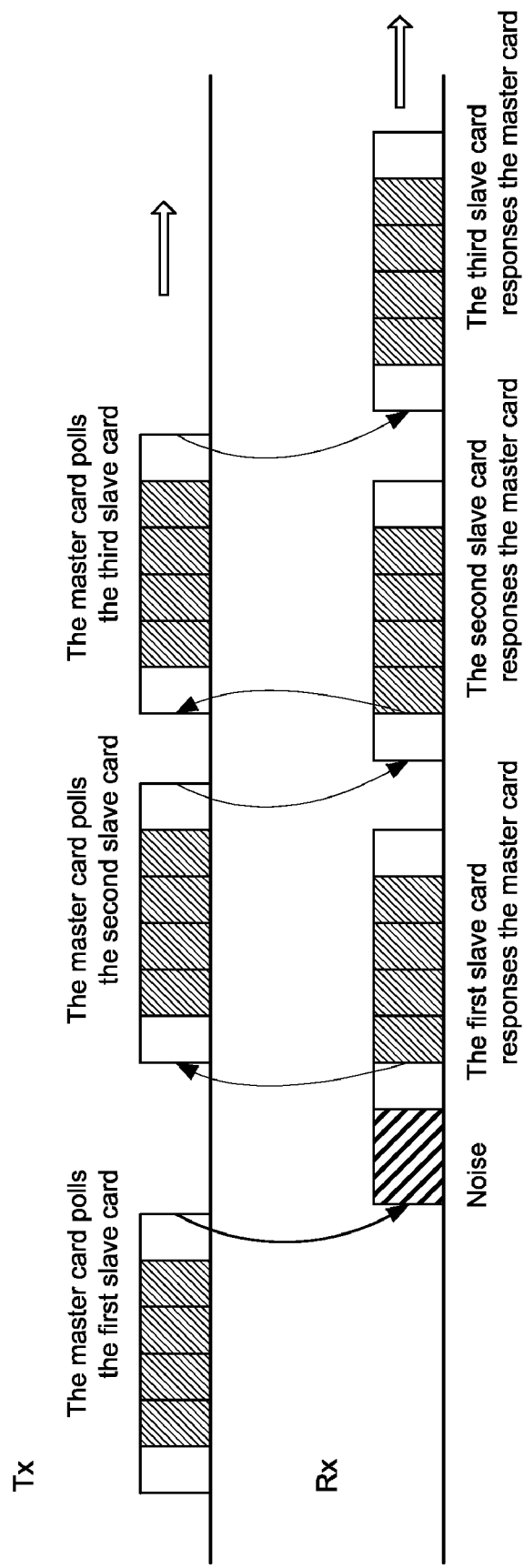
FIG. 5 is a schematic view for illustrating how the master card processes the initial packet in the response message from slave card.

FIG. 5 is a schematic view for illustrating how the master card 10 processes initial packet in the response message from slave card. The master card 10 halts sending the next command when the initial packet in the response message from slave card is not correct, for example, the station number information in the initial packet in the response message form the currently-accessed slave card is wrong. The master card 10 halts sending the next command until the master card 10 judges that it receives a correct initial packet in the response message. Alternatively, the master card 10 halts sending the next command until the received signal from the currently-accessed slave card is already stopped for a predetermined silence time.

Figure 6:
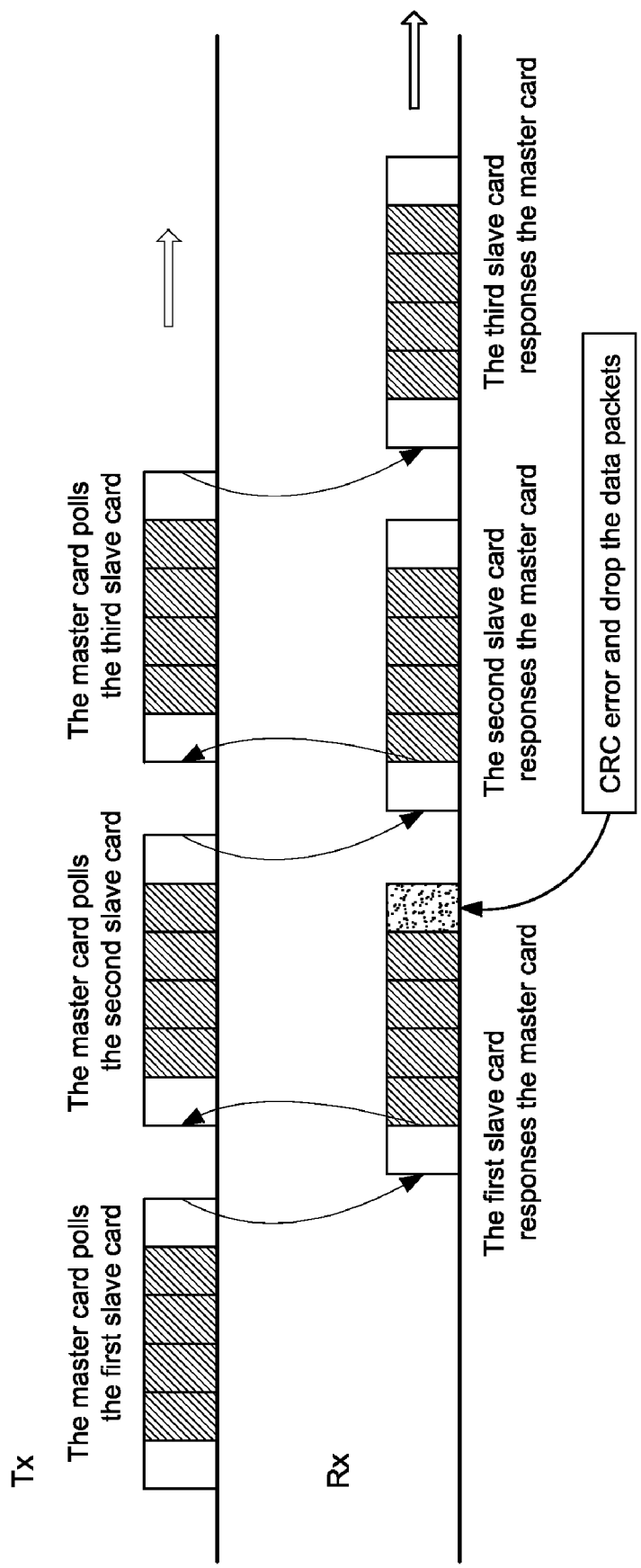
FIG. 6 is a schematic view for illustrating how the master card processes the CRC check packet in the response message from the slave card.

FIG. 6 is a schematic view for illustrating how the master card 10 processes CRC check packet in the response message from the slave card. The master card 10 drops the data packets 62A-62D corresponding to a CRC check packet 64 when the CRC check is judged to be incorrect. As shown in this figure, the data packets 62A-62D are, for example, the data sent from the first slave card 20A. Afterward, the master card 10 further sends command to another slave card.

Figure 7:
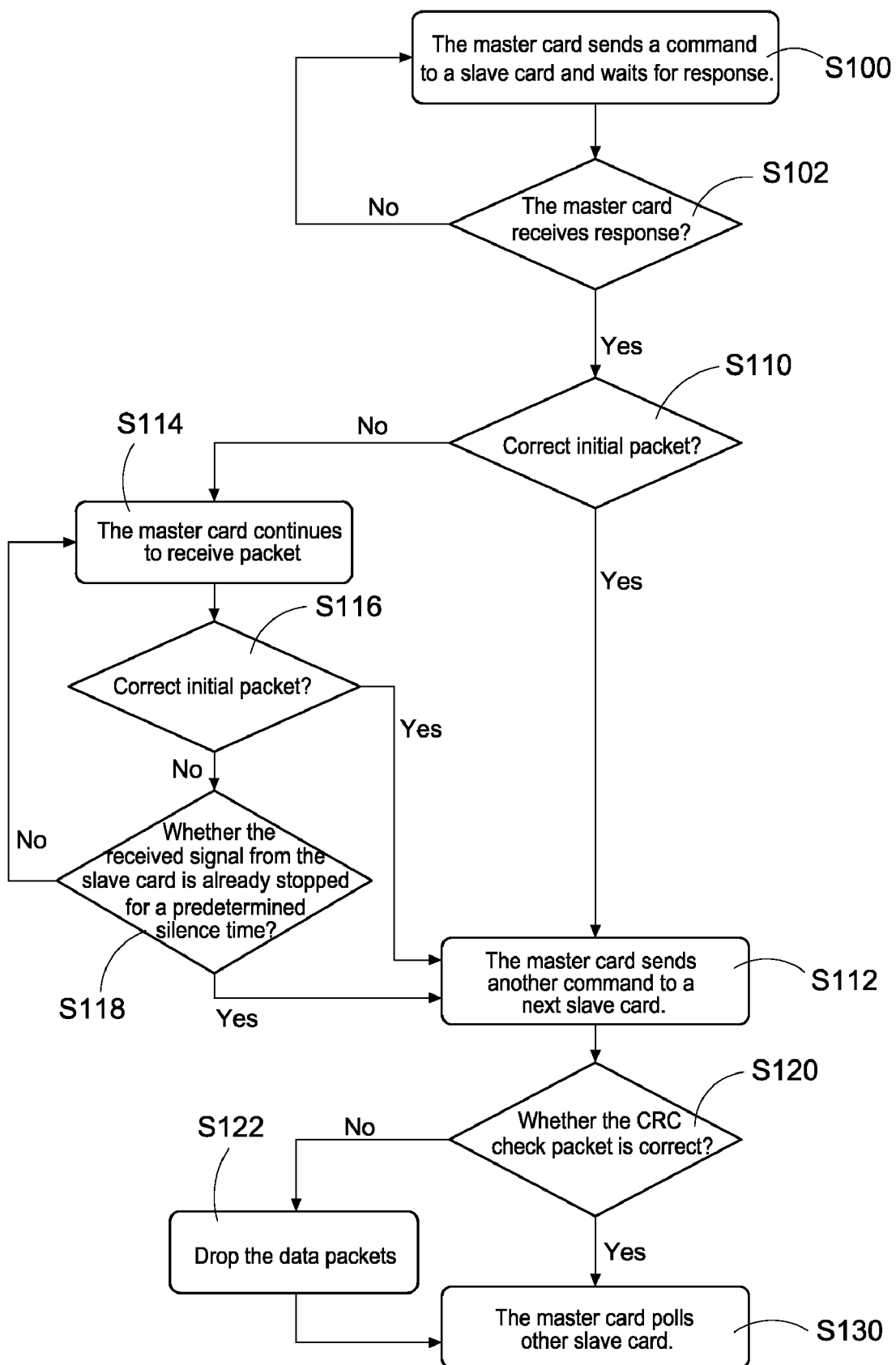
FIG. 7 shows the flowchart for the operation of the master-slave card system of the present invention.

FIG. 7 shows the flowchart for the operation of the master-slave card system of the present invention. The master card 10 first sends a command to a slave card (such as the first slave card 20A) and waits response from the slave card in step S100. When the master card 10 receives a response message from the first slave card 20A (step 102), the master card 10 judges whether the response message from the first slave card 20A contains a correct initial packet (step 110). When the response message from the first slave card 20A contains a correct initial packet, the master card 10 sends another command to a next slave card (such as the second slave card 20B) in step S112. When the initial packet in the response message from the first slave card 20A is not correct, the master card 10 keeps receiving packet from the first slave card 20A in step S114 and then checks whether it receives the correct initial packet in step S116. When the initial packet is judged to be correct in step S116, the procedure proceeds to step 112 wherein the master card 10 sends another command to a next slave card. Alternatively, the master card 10 halts sending the next command and judges whether the received signal from the first slave card 20A is already stopped for a predetermined silence time in step S118. If false, the procedure proceeds to step S114, else the procedure proceeds to step S112. After step S112, the master card 10 judges whether the CRC check packet of the first slave card 20A is correct in step S120. If the CRC check packet is not correct, the master card 10 drops the response message of the first slave card 20A in step S122 and then continues polling other slave cards in step S130.

The advantages of the present invention can be summarized as follows:

1. The number of digital input/output points can be flexibly expanded by setting station number information for the slave card and serially connecting the master care and the slave cards.

2. The master card polls the slave card sequentially. The master card sends command to a next slave card when the initial packet in the response message of a currently-accessed slave card is correct. Therefore, the polling time for overall system can be reduced and the transmission efficiency is enhanced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for operating a master-slave card system composed of a master card and a plurality of slave cards connected in series, the method comprising:

the master card sending a command to the slave cards, the command comprising an initial packet, a plurality of data packets and a CRC check packet, the initial packet comprising station number information to designate a salve card;

the designated slave card designated by the command replying the master card with a response message, wherein the response message comprises an initial packet, a CRC check packet and a plurality of data packets;

the master card sending another command to a next slave card when the master card judges that the initial packet of the designated slave card is correct;

the master card keeping receiving packet from the designated slave card when the initial packet of the designated slave card is not correct;

the master card sending another command to the next slave card when the master card judges that the initial packet of the designated slave card is correct; and the master card sending another command to the next slave card if the master card judges that the initial packet of the designated slave card is not correct and if a received signal from the designated slave card is already stopped for a predetermined silence time.

2. The method as in claim 1, further comprising:

the master card keeping receiving packet from the designated slave card and halts sending command when the initial packet of the designated slave card is not correct.

3. The method as in claim 1, further comprising:

the master card examining the CRC check packet in the response message; and the master card dropping the data packets when the CRC check packet in the response message is not correct.

* * * * *